United States Patent

Dehner et al.

[11] Patent Number: 5,848,357
[45] Date of Patent: Dec. 8, 1998

[54] METHOD AND APPARATUS IN A RADIO COMMUNICATION SYSTEM FOR IMPLEMENTING A FREQUENCY REUSE PLAN

[75] Inventors: Leo G. Dehner, Southlake; Thomas Casey Hill, Trophy Club, both of Tex.; Kevin Lynn Baum, Rolling Meadows, Ill.

[73] Assignee: Motorola, Inc., Schaumburg, Ill.

[21] Appl. No.: 829,271

[22] Filed: Mar. 31, 1997

[51] Int. Cl.$^6$ ........................................................ H04Q 7/20
[52] U.S. Cl. ............................................. 455/447; 455/458
[58] Field of Search ..................................... 455/422, 445, 455/446, 447, 448, 449, 458, 62, 67.1, 561, 550, 296; 375/346, 348; 370/313, 314, 327, 329, 330, 341, 347

[56] References Cited

U.S. PATENT DOCUMENTS 5,666,649  9/1997  Dent ........................................ 455/447
5,711,007  1/1998  Lin et al. ................................. 455/447

*Primary Examiner*—Thanh Cong Le
*Attorney, Agent, or Firm*—R. Louis Breeden

[57] ABSTRACT

A radio communication system (100) implements a frequency reuse plan by sending a message (308) simultaneously with other messages in a plurality of cell clusters (202–208) utilizing the frequency reuse plan, which provides a message carrier-to-interference ratio (C/I) sufficient for reception of the message when a receiver (104) is adjusted in accordance with a periodically transmitted pilot symbol (402–408). The C/I is smaller than preferred for reception of the pilot symbol. The pilot symbol is periodically transmitting simultaneously with other pilot symbols in a time diverse manner such that pilot symbol transmissions for adjacent ones of the plurality of cell clusters occur in non-overlapping time slots, thereby generating the larger C/I preferred for reception of the pilot symbol. The pilot symbol and the message are received by the receiver, and the receiver is adjusted in accordance with the pilot symbol to demodulate the message.

14 Claims, 3 Drawing Sheets

METHOD AND APPARATUS IN A RADIO COMMUNICATION SYSTEM FOR IMPLEMENTING A FREQUENCY REUSE PLAN

FIELD OF THE INVENTION

This invention relates in general to radio communication systems, and more specifically to a method and apparatus for implementing a frequency reuse plan in a radio communication system utilizing pilot symbol assisted modulation (PSAM) techniques.

BACKGROUND OF THE INVENTION

Modern radio communication systems have constantly sought to achieve higher data rates while simultaneously achieving greater frequency reuse to conserve radio frequency (RF) spectrum and to reduce transmission cost per bit. In a recently evaluated radio messaging system, it was learned that PSAM techniques would allow greater frequency reuse and lower transmission cost per bit by allowing closer co-channel site separation during directed message delivery.

A problem occurred, however, when closer co-channel site separation was found to corrupt reception of the pilot symbols required for PSAM, because the pilot symbols require a higher carrier-to-interference ratio (C/I) to produce an accurate reference than the C/I required for message reception alone.

Thus, what is needed is a method and apparatus that can achieve a high level of frequency reuse using PSAM techniques for message reception, while at the same time achieving a preferred level of C/I for the accurate pilot symbol reception required.

SUMMARY OF THE INVENTION

An aspect of the present invention is a method in a radio communication system for implementing a frequency reuse plan. The method comprises the step of sending a message simultaneously with other messages in a plurality of cell clusters utilizing the frequency reuse plan, which provides a message carrier-to-interference ratio large enough for reception of the message by a receiver when the receiver is adjusted in accordance with a periodically transmitted pilot symbol. The message carrier-to-interference ratio is smaller than preferred for reception of the pilot symbol. The method further comprises the step of periodically transmitting the pilot symbol simultaneously with other pilot symbols in the plurality of cell clusters in a time diverse manner such that pilot symbol transmissions for adjacent ones of the plurality of cell clusters occur in non-overlapping time slots, thereby generating a larger carrier-to-interference ratio, as preferred for reception of the pilot symbol. The method also includes the steps of receiving the pilot symbol and the message by the receiver, and adjusting the receiver in accordance with the pilot symbol to demodulate the message.

Another aspect of the present invention is a controller in a radio communication system for implementing a frequency reuse plan. The controller comprises an input interface for receiving a message from a message originator, and a processor coupled to the input interface for processing the message. The controller further comprises an output interface coupled to the processor for controlling a radio transmitter to send the message, and a memory coupled to the processor for storing the message along with software elements for programming the processor. The software elements comprise a message transmission element for controlling the processor to send the message simultaneously with other messages in a plurality of cell clusters utilizing the frequency reuse plan, which provides a message carrier-to-interference ratio large enough for reception of the message by a receiver when the receiver is adjusted in accordance with a periodically transmitted pilot symbol. The message carrier-to-interference ratio is smaller than preferred for reception of the pilot symbol. The software elements further comprise a multi-slot pilot symbol transmitter coupled to the processor for controlling the processor to periodically transmit the pilot symbol simultaneously with other pilot symbols in the plurality of cell clusters in a time diverse manner such that pilot symbol transmissions for adjacent ones of the plurality of cell clusters occur in non-overlapping time slots, thereby generating a larger carrier-to-interference ratio, as preferred for reception of the pilot symbol. Another aspect of the present invention is a receiver in a radio communication system for implementing a frequency reuse plan. The receiver comprises a receiver element for receiving a message and for receiving a periodically transmitted pilot symbol, and a processor coupled to the receiver element for processing the message. The receiver further comprises a user interface coupled to the processor for conveying the message to a user and for providing control of the receiver by the user, and a memory coupled to the processor for storing the message along with software elements for programming the processor. The software elements comprise a receiver controller for programming the processor to control the receiver element to receive a message sent simultaneously with other messages in a plurality of cell clusters utilizing the frequency reuse plan, which provides a message carrier-to-interference ratio large enough for reception of the message by a receiver when the receiver is adjusted in accordance with a periodically transmitted pilot symbol. The message carrier-to-interference ratio is smaller than preferred for reception of the pilot symbol. The software elements further comprise a pilot reception element coupled to the receiver controller for programming the processor to control the receiver element to receive the pilot symbol periodically transmitted simultaneously with other pilot symbols in the plurality of cell clusters in a time diverse manner such that pilot symbol transmissions for adjacent ones of the plurality of cell clusters occur in non-overlapping time slots, thereby generating a larger carrier-to-interference ratio, as preferred for reception of the pilot symbol. The software elements also include an adjuster coupled to the pilot reception element for programming the processor to make adjustments in accordance with the pilot symbol to demodulate the message.

DETAILED DESCRIPTION OF THE DRAWINGS

Figure 1:
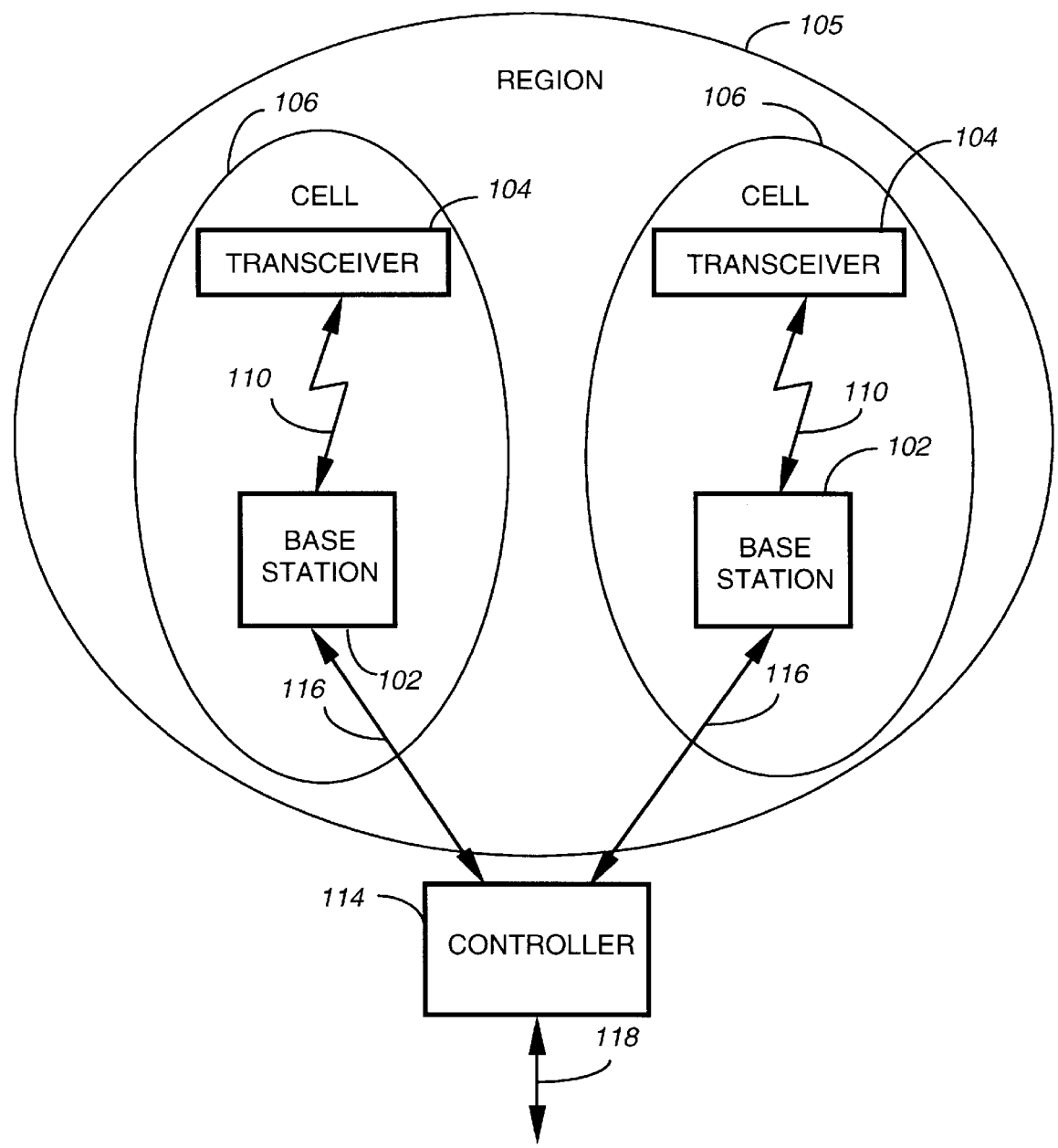
FIG. 1 is an electrical block diagram of a two-way radio communication system in accordance with the present invention.

Referring to FIG. 1, an electrical block diagram depicts a two-way radio communication system 100 in accordance with the present invention. The radio communication system 100 comprises at least two conventional base stations 102, the base stations 102 providing radio coverage in a plurality of cells 106 of a region 105 in which the radio communication system 100 provides service. The base stations 102 are coupled by radio paths 110 to transceivers 104. The transceivers 104 are preferably two-way messaging units, which can generate inbound responses to the base stations 102. Geographically close cells 106 can interfere with one another. For this reason a controller 114 in accordance with the present invention controls the base stations 102 to transmit on different frequencies in clusters of the cells 106 according to a frequency reuse plan.

The base stations 102 are coupled by communication links 116 to the controller 114 for controlling the base stations 102 using techniques well known in the art. The controller 114 is coupled through an additional communication link 118 to an input entity (not shown) for generating message originations using well-known techniques. The input entity can be, for example, a telephone set, a video display terminal, another controller, or a network interconnecting any or all of the above input entities. The hardware of the controller 114 is preferably similar to that of the RF-Conductor!™ message distributor manufactured by Motorola, Inc. of Schaumburg, Ill. The base stations 102 are preferably similar to the Nucleus® Orchestra! transmitter and the RF-Audience!™ inbound base receiver manufactured by Motorola, Inc. It will be appreciated that other similar hardware can be utilized as well for the controller 114, and the base stations 102. The signals over the radio paths 110 preferably utilize a well-known messaging protocol, such as a member of Motorola's FLEX™ family of protocols. Modulation is preferably Quadrature Amplitude Modulation (QAM). These protocols comprise error detection and correction mechanisms, which give the protocols the necessary robustness for use in radio communication systems. It will be appreciated that, alternatively, other similar protocols and modulation types can be used. It will be further appreciated that the present invention can be applied to a one-way radio communication system as well, in which case the transceivers 104 are replaced by receivers.

Figure 2:
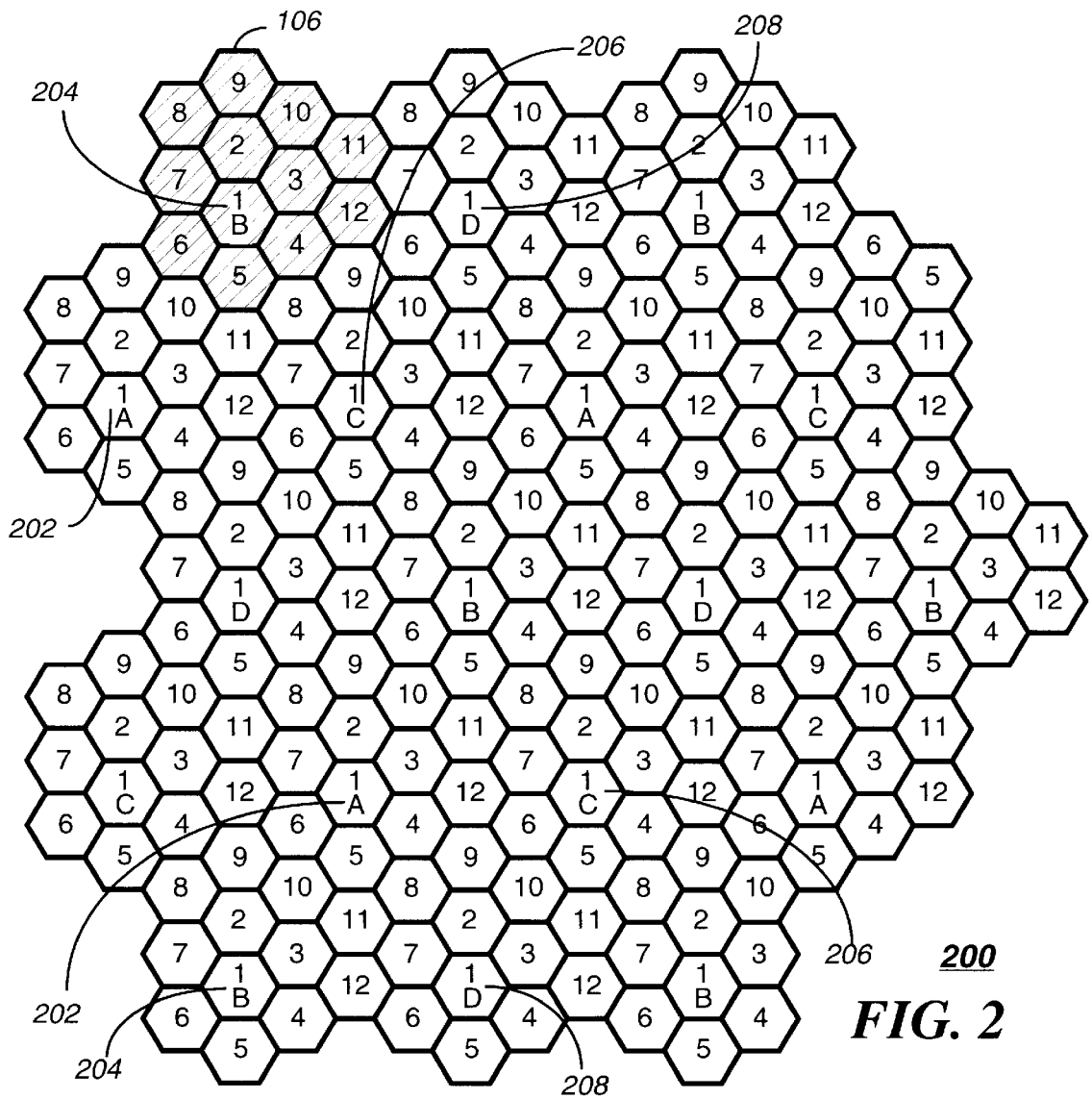
FIG. 2 is a diagram of a frequency reuse plan in accordance with the present invention.

Referring to FIG. 2, a diagram 200 depicts a frequency reuse plan in accordance with the present invention. The diagram 200 comprises the plurality of cells 106 in clusters in which the cells have been numbered from 1 to 12 to represent each of 12 radio frequencies used per cluster. To make it easier to identify the clusters, the upper left cluster 204 has been cross-hatched. Note that for sending messages the 12 frequencies are reused in adjacent clusters, thereby conserving radio spectrum. It has been determined that for the radio communication system 100 the 12-frequency reuse plan depicted in the diagram 200 provides a carrier-to-interference ratio (C/I) large enough for reception of a message by the transceiver 104 when the gain and phase of the transceiver 104 are adjusted in accordance with a periodically transmitted pilot symbol. Unfortunately, the 12-frequency reuse plan does not provide the somewhat higher C/I preferred for reception of the pilot symbols themselves. To increase the C/I for pilot symbol transmission, a pilot symbol transmission plan has been overlaid in the diagram 200, in accordance with the present invention. The pilot symbol transmission plan is indicated by the letters A, B, C, and D in adjacent cell clusters, such as the clusters 202, 204, 206, and 208. The letters A, B, C, and D represent four non-overlapping time slots during which the pilot symbol for the corresponding cell cluster 202–208 is transmitted. In other words, during time slot A the base stations 102 in the clusters labeled A are controlled by the controller 114 to transmit the pilot symbol on the 12 frequencies. Then in time slot B the base stations 102 in the clusters labeled B are controlled to transmit the pilot symbol on the 12 frequencies, and so on. By transmitting the pilot symbols in the time-slotted manner described utilizing the inventive pilot symbol transmission plan, the distance-to-radius ratio (D/R) is increased from D/R=6 for co-channel message transmission to D/R=12 for co-channel pilot symbol transmission, thereby providing the higher C/I preferred for pilot symbol transmission. Simulations show that as much as 3 dB improvement in receiver sensitivity for message reception is obtained by increasing the C/I of the pilot symbols in accordance with the present invention.

Figure 3:
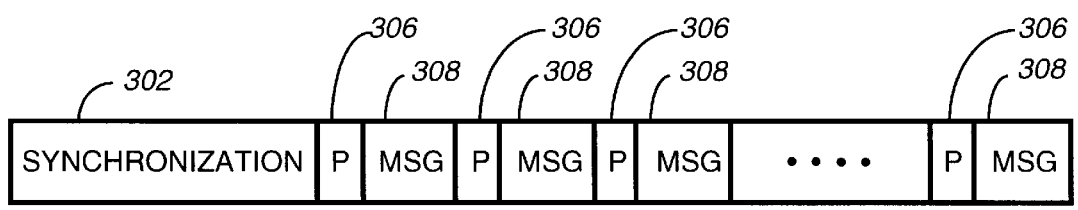
FIG. 3 is a protocol diagram depicting an outbound protocol in accordance with the present invention.

Referring to FIG. 3, a protocol diagram 300 depicts an outbound protocol in accordance with the present invention. The protocol diagram 300 comprises a synchronization portion 302 for synchronizing the transceiver 104 with the base station 102 using well-known techniques. The protocol diagram 300 further comprises a plurality of pilot symbol sequences 306 interspersed among a plurality of messages 308. Preferably, the transmissions are organized into frames of 1.875 seconds duration, consistent with the FLEX™ protocol. Each frame preferably comprises four blocks of data, each block including 2015 message data symbols and 126 pilot symbol sequences 306. The raw bit rates are preferably selected from 24 Kbps (16 QAM), 36 Kbps (64 QAM), and 48 Kbps (256 QAM). It will be appreciated that, alternatively, other frame and block lengths and other bit rates can be used as well.

Figure 4:
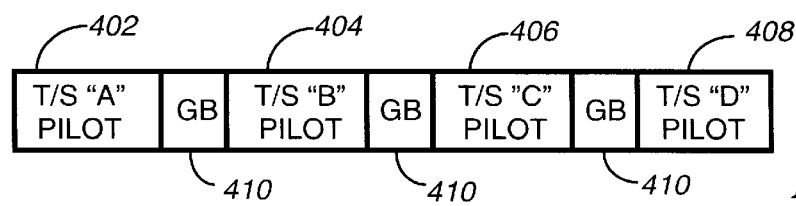
FIG. 4 is a protocol diagram depicting a detailed view of a pilot symbol sequence in accordance with the present invention.

Referring to FIG. 4, a protocol diagram depicts a detailed view of the pilot symbol sequence 306 in accordance with the present invention. The pilot symbol sequence preferably comprises four pilot symbols 402, 404, 406, 408 transmitted, respectively, in time slots A, B, C, and D. The pilot symbols have a predetermined value, preferably a value which produces a highest power in both the received real and quadrature signals. The transceiver 104 then continuously adjusts itself according to the pilot symbols using well-known pilot symbol assisted modulation (PSAM) techniques. The pilot symbols 402–408 preferably are separated by guard bands 410 of silence (0 symbol), so that pilot symbols transmitted in different time slots will not overlap at the transceiver 104 due to differential radio propagation delay, which would otherwise degrade the C/I, particularly in rural regions that use larger cell sizes. In one embodiment according to the present invention, the cell clusters 202–208 transmit silence (0 symbol) during all pilot symbol time slots except their assigned pilot symbol time slot. In another embodiment, the cell clusters 202–208 transmit message data during all pilot symbol time slots except their assigned pilot symbol time slot. This is possible, because interfering message data is less disruptive to pilot symbol reception than another interfering pilot symbol transmission. In a variation of this embodiment, message data also can be transmitted in the guard bands 410 instead of silence. In yet another embodiment, adjacent cell clusters 202–208 transmit sequences of pilot symbols which are orthogonal to one another during each of the four time slots. The transceiver 104 then multiplies the received pilot tone sequence by the sequence assigned to the cluster in which the transceiver 104 is positioned (as informed by the controller 114 through a control message), thereby eliminating the effects of the interfering orthogonal pilot tone sequences.

Figure 5:
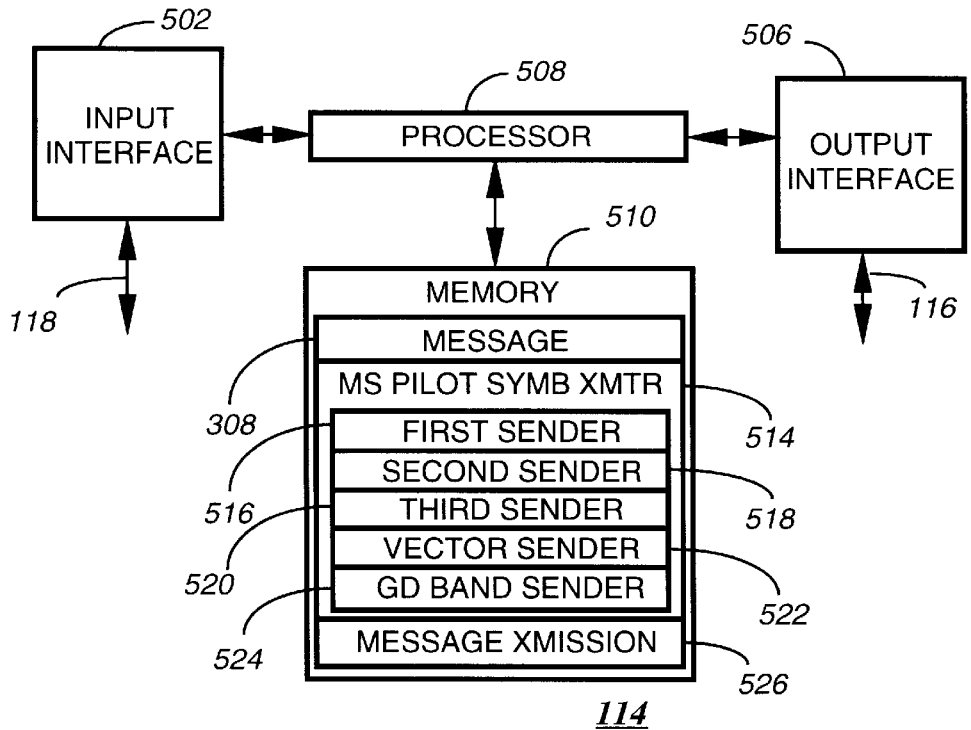
FIG. 5 is an electrical block diagram of a controller in accordance with the present invention.

Referring to FIG. 5, an electrical block diagram of the controller 114 in accordance with the present invention comprises a conventional input interface 502 coupled to the communication link 118 for receiving a message 308 from a message originator. The controller 114 further comprises a conventional processor 508 for processing the message 308, and a conventional output interface 506 coupled to the communication link 116 for outputting the message 308 through the base stations 102. The processor 508 is coupled to a conventional memory 510 for storing the message 308 and for storing software elements for programming the processor 508 in accordance with the present invention. The software elements comprise a message transmission element 528 for controlling the processor 508 to send the message 308 simultaneously with other messages 308 in the plurality of cell clusters 202–208 utilizing the frequency reuse plan, which provides a message C/I large enough for reception of the message by the transceiver 104 when the transceiver 104 is adjusted in accordance with the periodically transmitted pilot symbol 402–408, wherein the message C/I is smaller than preferred for reception of the pilot symbol 402–408. The software elements further comprise a multi-slot pilot symbol transmitter 514 coupled to the processor 508 for controlling the processor 508 to periodically transmit the pilot symbol 402–408 simultaneously with other pilot symbols 402–408 in the plurality of cell clusters 202–208 in a time diverse manner such that pilot symbol transmissions for adjacent ones of the plurality of cell clusters 202–208 occur in non-overlapping time slots, thereby generating a larger C/I, as preferred for reception of the pilot symbol 402–408.

In one embodiment, the multi-slot pilot symbol transmitter 514 comprises a first sender 516 for transmitting the pilot symbol 402–408 simultaneously with silence from the adjacent ones of the plurality of cell clusters 202–208. In another embodiment, the multi-slot pilot symbol transmitter 514 comprises a second sender 518 for transmitting the pilot symbol 402–408 simultaneously with message data transmitted from the adjacent ones of the plurality of cell clusters 202–208. In yet another embodiment, the multi-slot pilot symbol transmitter 514 comprises a third sender 520 for transmitting the pilot symbol 402–408 simultaneously with other pilot symbols 402–408 transmitted from the adjacent ones of the plurality of cell clusters 202–208, wherein the other pilot symbols are orthogonal to the pilot symbol. The multi-slot pilot symbol transmitter 514 comprises a vector sender 522 for transmitting a vector to the transceiver 104 to identify a time slot to use for receiving the pilot symbol 402–408 and to specify how many time slots are being used. The vector sender 522 utilizes well-known protocol techniques for transmitting the vector. The multi-slot pilot symbol transmitter 514 also includes a guard band sender 524 for providing the guard bands 410 between the non-overlapping time slots to accommodate a radio propagation delay.

Figure 6:
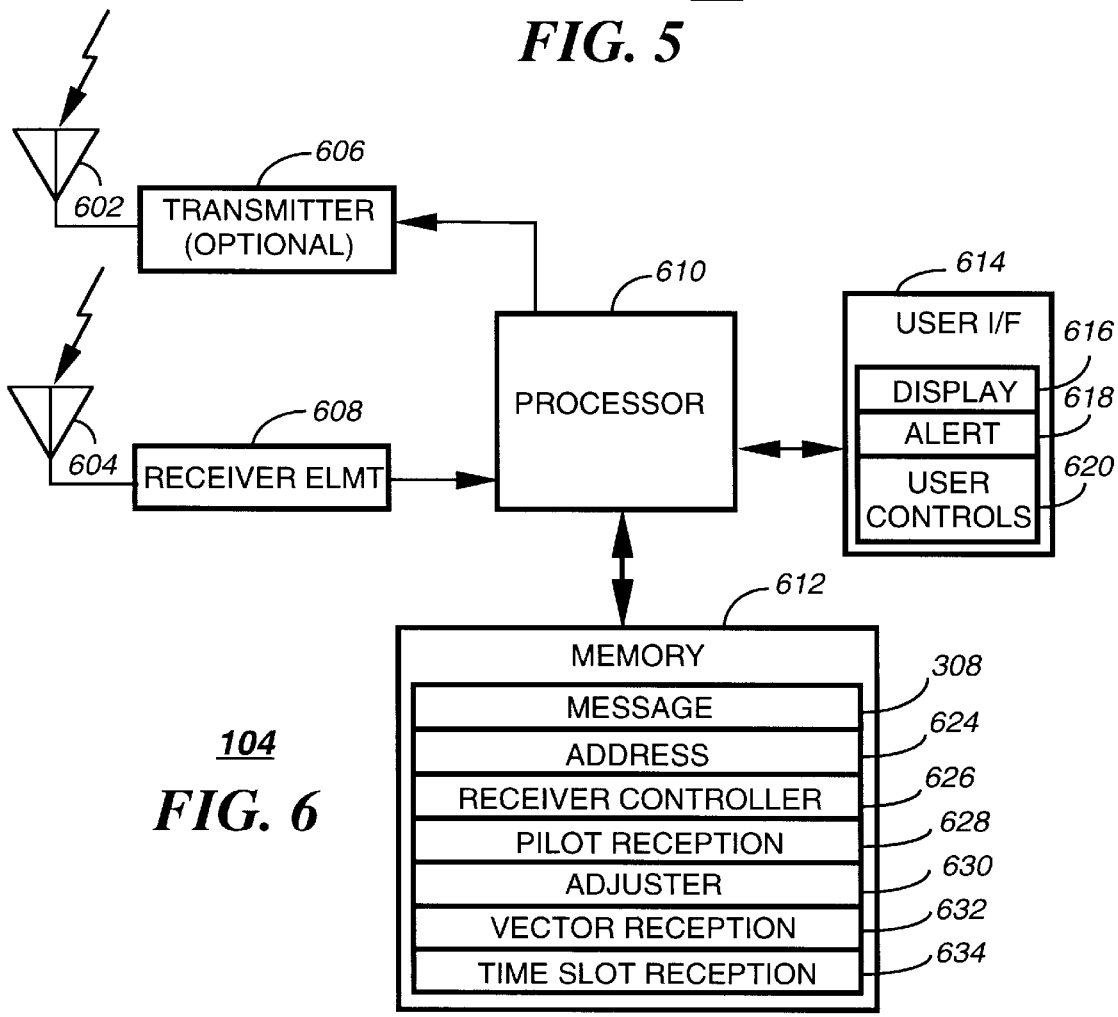
FIG. 6 is an electrical block diagram of a transceiver in accordance with the present invention.

Referring to FIG. 6, an electrical block diagram of the transceiver 104 in accordance with the present invention comprises an antenna 604 for intercepting transmissions from the base stations 102. The antenna 604 is coupled to a conventional receiver element 608 for receiving the transmissions to derive information therefrom. The receiver element 608 is coupled to a conventional processor 610, e.g., a conventional digital signal processor, for processing the received information, including a message 308 and the pilot symbol sequence 306 for improving the sensitivity of the demodulation process of the transceiver 104, as is discussed further herein below. The processor 610 is preferably also coupled to a transmitter 606, which is coupled to an antenna 602 for transmitting acknowledgments and other messages to the controller 114. It will be appreciated that, alternatively, the transmitter 606 and the antenna 602 can be omitted in one-way communication systems. The processor 610 is coupled to a user interface 614 for conveying portions of the received information to a user, via, for example, a conventional liquid crystal display 616. The user interface 614 also includes a conventional alert 618 for alerting the user that new information has arrived. In addition, the user interface 614 includes well-known user controls 620 for controlling the transceiver 104. The processor 610 is coupled to a conventional memory 612 for storing the message 308 and an address 624 identifying the transceiver 104, and for storing software elements for programming the processor 610 in accordance with the present invention.

The software elements comprise a receiver controller 626 for programming the processor 610 to control the receiver element 608 to receive the message 308 sent simultaneously with other messages 308 in the plurality of cell clusters 202–208 utilizing the frequency reuse plan, which provides a message C/I large enough for reception of the message 308 by the transceiver 104 when the transceiver 104 is adjusted in accordance with the periodically transmitted pilot symbol 402–408, wherein the message C/I is smaller than preferred for reception of the pilot symbol 402–408. The software elements further comprise a pilot reception element 628 for programming the processor 610 to control the receiver element 608 to receive the pilot symbol 402–408 periodically transmitted simultaneously with other pilot symbols 402–408 in the plurality of cell clusters 202–208 in a time diverse manner, as described in the discussion of FIGS. 2–4, such that pilot symbol transmissions for adjacent ones of the plurality of cell clusters 202–208 occur in non overlapping time slots, thereby generating a larger C/I, as preferred for reception of the pilot symbol. The software elements also include an adjuster 630 for programming the processor 610 to make adjustments in accordance with the pilot symbol 402–408 to demodulate the message 308 using well-known PSAM techniques. In addition, the software elements include a vector reception element 632 for programming the processor 610 to control the transceiver 104 to receive a vector transmitted to the transceiver 104 to identify a time slot to use for receiving the pilot symbol 402–408 and to specify how many time slots are being used. The software elements further comprise a time slot reception element 634 for programming the processor 610 to control the receiver element 608 to receive the pilot symbol 402–408 in the time slot identified by the vector.

Thus, it should be clear from the foregoing disclosure that the present invention provides a method and apparatus that advantageously achieves a high level of frequency reuse using PSAM techniques for message reception, while at the same time achieving a preferred level of C/I for the accurate pilot symbol reception required.

While the foregoing has disclosed by way of example an embodiment in accordance with the present invention, it will be appreciated that many alternative embodiments in accordance with the present invention may occur to one of ordinary skill in the art, given the teachings of this disclosure. Consequently, the scope of the invention is delimited only according to the following claims.

What is claimed is:

1. A method in a radio communication system for implementing a frequency reuse plan, the method comprising the steps of:

sending a message simultaneously with other messages in a plurality of cell clusters utilizing the frequency reuse plan, which provides a message carrier-to-interference ratio large enough for reception of the message by a receiver when the receiver is adjusted in accordance with a periodically transmitted pilot symbol, wherein the message carrier-to-interference ratio is smaller than preferred for reception of the pilot symbol;

periodically transmitting the pilot symbol simultaneously with other pilot symbols in the plurality of cell clusters in a time diverse manner such that pilot symbol transmissions for adjacent ones of the plurality of cell clusters occur in non-overlapping time slots, thereby generating a larger carrier-to-interference ratio, as preferred for reception of the pilot symbol;

receiving the pilot symbol and the message by the receiver; and adjusting the receiver in accordance with the pilot symbol to demodulate the message.

2. The method of claim 1, wherein the transmitting step comprises the step of transmitting the pilot symbol simultaneously with silence from the adjacent ones of the plurality of cell clusters.

3. The method of claim 1, wherein the transmitting step comprises the step of transmitting the pilot symbol simultaneously with message data transmitted from the adjacent ones of the plurality of cell clusters.

4. The method of claim 1, wherein the transmitting step comprises the step of transmitting the pilot symbol simultaneously with other pilot symbols transmitted from the adjacent ones of the plurality of cell clusters, wherein the other pilot symbols are orthogonal to the pilot symbol.

5. The method of claim 1, further comprising the step of transmitting a vector to the receiver to identify a time slot to use for receiving the pilot symbol and to specify how many time slots are being used.

6. The method of claim 1, wherein the transmitting step comprises the step of providing guard bands between the non overlapping time slots to accommodate a radio propagation delay.

7. A controller in a radio communication system for implementing a frequency reuse plan, the controller comprising:

an input interface for receiving a message from a message originator;

a processor coupled to the input interface for processing the message;

an output interface coupled to the processor for controlling a radio transmitter to send the message; and a memory coupled to the processor for storing the message along with software elements for programming the processor, the software elements comprising:

a message transmission element for controlling the processor to send the message simultaneously with other messages in a plurality of cell clusters utilizing the frequency reuse plan, which provides a message carrier-to-interference ratio large enough for reception of the message by a receiver when the receiver is adjusted in accordance with a periodically transmitted pilot symbol, wherein the message carrier-to-interference ratio is smaller than preferred for reception of the pilot symbol; and a multi-slot pilot symbol transmitter coupled to the processor for controlling the processor to periodically transmit the pilot symbol simultaneously with other pilot symbols in the plurality of cell clusters in a time diverse manner such that pilot symbol transmissions for adjacent ones of the plurality of cell clusters occur in non-overlapping time slots, thereby generating a larger carrier-to-interference ratio, as preferred for reception of the pilot symbol.

8. The controller of claim 7, wherein the multi-slot pilot symbol transmitter comprises a first sender for transmitting the pilot symbol simultaneously with silence from the adjacent ones of the plurality of cell clusters.

9. The controller of claim 7, wherein the multi-slot pilot symbol transmitter comprises a second sender for transmitting the pilot symbol simultaneously with message data transmitted from the adjacent ones of the plurality of cell clusters.

10. The controller of claim 7, wherein the multi-slot pilot symbol transmitter comprises a third sender for transmitting the pilot symbol simultaneously with other pilot symbols transmitted from the adjacent ones of the plurality of cell clusters, wherein the other pilot symbols are orthogonal to the pilot symbol.

11. The controller of claim 7, wherein the multi-slot pilot symbol transmitter comprises a vector sender for transmitting a vector to the receiver to identify a time slot to use for receiving the pilot symbol and to specify how many time slots are being used.

12. The controller of claim 7, wherein the multi-slot pilot symbol transmitter comprises a guard band sender for providing guard bands between the non-overlapping time slots to accommodate a radio propagation delay.

13. A receiver in a radio communication system for implementing a frequency reuse plan, the receiver comprising:

a receiver element for receiving a message and for receiving a periodically transmitted pilot symbol;

a processor coupled to the receiver element for processing the message;

a user interface coupled to the processor for conveying the message to a user and for providing control of the receiver by the user; and a memory coupled to the processor for storing the message along with software elements for programming the processor, the software elements comprising:

a receiver controller for programming the processor to control the receiver element to receive a message sent simultaneously with other messages in a plurality of cell clusters utilizing the frequency reuse plan, which provides a message carrier-to-interference ratio large enough for reception of the message by a receiver when the receiver is adjusted in accordance with a periodically transmitted pilot symbol, wherein the message carrier-to-interference ratio is smaller than preferred for reception of the pilot symbol;

a pilot reception element coupled to the receiver controller for programming the processor to control the receiver element to receive the pilot symbol periodically transmitted simultaneously with other pilot symbols in the plurality of cell clusters in a time diverse manner such that pilot symbol transmissions for adjacent ones of the plurality of cell clusters occur in non-overlapping time slots, thereby generating a larger carrier-to-interference ratio, as preferred for reception of the pilot symbol; and an adjuster coupled to the pilot reception element for programming the processor to make adjustments in accordance with the pilot symbol to demodulate the message.

14. The receiver of claim 13, wherein the software elements further comprise:

a vector reception element for programming the processor to control the receiver to receive a vector transmitted to the receiver to identify a time slot to use for receiving the pilot symbol and to specify how many time slots are being used; and a time slot reception element coupled to the vector reception element for programming the processor to control the receiver element to receive the pilot symbol in the time slot identified by the vector.

* * * * *